No. 741,764. PATENTED OCT. 20, 1903.
J. W. BROWN.
COMB FRAME FOR BEEHIVES.
APPLICATION FILED MAY 7, 1903.
NO MODEL.

Witnesses
C. H. Walker
James R. Mansfield

Inventor.
James W. Brown,
By Alexander Powell
Attorney

No. 741,764.

Patented October 20, 1903.

UNITED STATES PATENT OFFICE.

JAMES W. BROWN, OF LOS ANGELES, CALIFORNIA.

COMB-FRAME FOR BEEHIVES.

SPECIFICATION forming part of Letters Patent No. 741,764, dated October 20, 1903.

Application filed May 7, 1903. Serial No. 156,104. (No model.)

*To all whom it may concern:*

Be it known that I, JAMES W. BROWN, residing in the city of Los Angeles, in the county of Los Angeles and State of California, have invented certain new and useful Improvements in Comb-Frames for Beehives; and I hereby declare that the following is a full, clear, and exact description thereof, reference being had to the accompanying drawings, which form part of this specification.

This invention is an improved reversible comb-frame for beehives, its object being to provide a simple frame which can be suspended in position, the suspending device supporting the frame from beneath while hanging it from the upper side so it will maintain its position by gravity, and such devices being reversible, so that the frame can be removed, reversed, and replaced. The reversible suspending devices, which in the simplest form are merely peculiarly-bent wires or rods, uphold the frames from beneath, so that they are not liable to sag or pull apart when full of honey.

The invention will be summarized in the claims and fully understood from the accompanying drawings, in connection with the description thereof.

Figure 1:
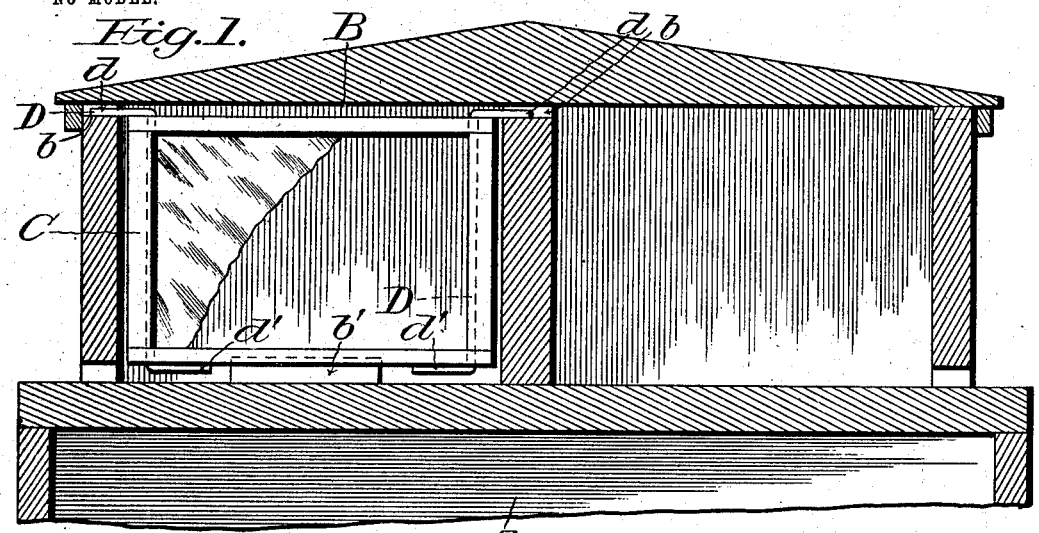
Figure 2:
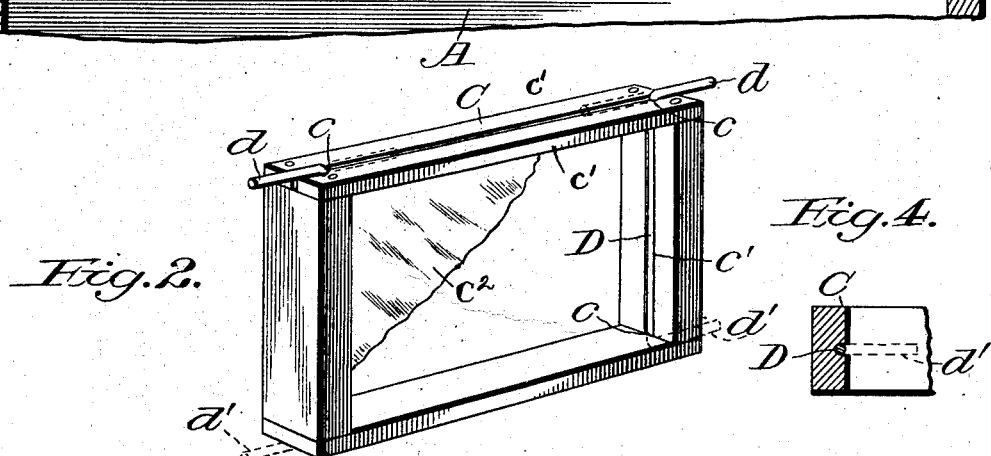
Figure 4:
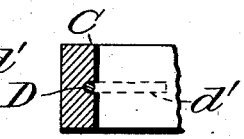
Figure 3:
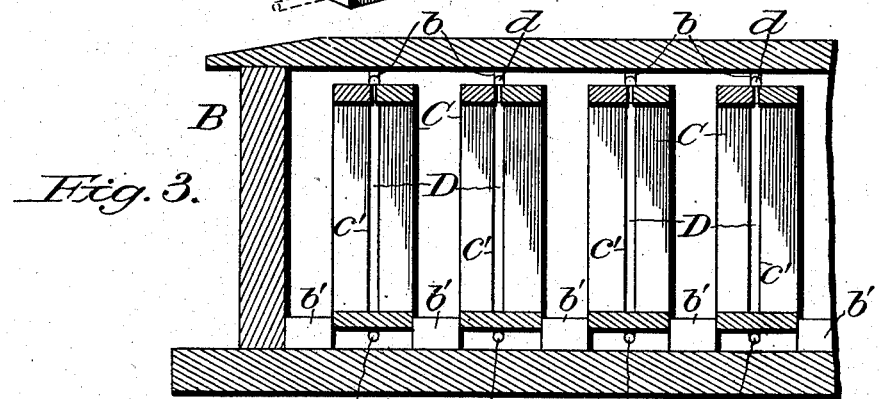

In said drawings, Figure 1 is a sectional view through the upper part of a beehive, showing one of my improved comb-frames in position therein. Fig. 2 is a perspective view of one of the frames removed, indicating in dotted lines how the suspending devices can be turned so as to enable the frame to be hung in inverted or reversed position. Fig. 3 is a detail sectional view through a series of frames suspended in a hive. Fig. 4 is a detail sectional view through one end of the comb-frame.

The beehive A is of any suitable construction, having a honey-chamber B on top, in which chamber are suspended a series of removable frames C, which may be of any suitable construction, and are preferably rectangular frames of light non-resinous non-odoriferous wood, so that the honey deposited therein will not be affected thereby. These frames may be simply tacked together, as my suspending devices form bonds holding the frame in shape. The suspending devices, as shown, are formed of lengths of wire D, passing through suitable apertures $c$ in the top and bottom pieces of the frame and through holes or grooves $c'$ in the inner faces of the side members of the frame, as shown. The upper and lower ends of these wires are bent in opposite directions at right angles, as shown at $d\ d'$, the lengths of the bends $d\ d'$ being such that when they are turned to lie in the central plane of the frame one bend will project beyond the end of the upper member of the frame, while the other member will project inwardly beneath the lower member of the frame. The outwardly-projecting member will serve as a suspending device and the lower inwardly-projecting member will serve as a support or hanger, upholding the frame from beneath, as will be obvious from the drawings. As both bends $d\ d'$ lie close against the outer sides of the frame, the wires D serve as frame fastening or retaining devices as well as supporting devices therefor. The projecting ends of the wires at the top side of frame are engaged in recesses $b$ in the upper sides of the honey-chamber B, across which the frames extend in parallel series, as usual. The lower ends of the frames may be properly spaced apart and steadied by blocks $b'$, as indicated in the drawings. One of the side members of the frames may be made in two longitudinal parts $c'\ c'$, and the comb foundation $c^2$ can be secured therebetween, as indicated in Fig. 2, before the frames are placed in the hive. When the frames are of wood, the parts $c'$ can be secured by small brads, so that they can be easily pried out and replaced. The recesses $b$ are so located that they keep the frames properly spaced at top.

Any number of my frames can be suspended side by side in the honey-chamber. When it is desired to reverse the frames, as is necessary to insure their full and equal filling with comb and honey by the bees, it is simply necessary to remove the cover of the honey-chamber, lift out the frames successively, turn the projecting top bend of the wire back over the top of frame, which will cause the other lower bend of the wire to project outwardly from the lower side of the frame, then reverse the frame and suspend it by the then outwardly-projecting bends of the wires.

The device is very simple and effective and provides a cheap, compact, and desirable reversible frame, which does not occupy any more room than the ordinary plain non-reversible frames.

Having thus described my invention, what I therefore claim as new, and desire to secure by Letters Patent thereon, is—

1. A reversible bee-comb frame, comprising a frame and wires attached to the ends thereof, having their upper ends bent outward to form hangers, and their lower ends bent inward to form supporters, said wires being rotatable so that when the frame is reversed the wires can be turned and the hangers become supporters and the supporters become hangers, substantially as described.

2. In combination with the frame, of the suspending devices extending vertically through the sides thereof, and having their ends bent in opposite directions, so as to form frame-hangers at top, and frame-supporters at bottom, substantially as described.

3. The herein-described reversible bee-comb frame, comprising a rectangular frame, and wires extending through the frame at each end thereof, said wires having their projecting ends, above and below the frame, respectively bent at right angles in opposite directions, the upper bend projecting beyond the sides of frame to form frame-hangers, and the lower bends projecting beneath the frame to support the weight thereof, said wires being rotatable so that the position of the bends may be reversed, and the frame suspended either side up, substantially as described.

In testimony that I claim the foregoing as my own I affix my signature in presence of two witnesses.

JAMES W. BROWN.

In presence of—
 HARRY CHANDLER,
 L. D. K. MACKNIGHT.